US009965371B2

(12) United States Patent
Hearn et al.

(10) Patent No.: US 9,965,371 B2
(45) Date of Patent: May 8, 2018

(54) AUTOMATICALLY DETERMINING AND INDICATING SYSTEM POSITIONS OF DEVICES IN A HIERARCHICAL BUS NETWORKED SYSTEM

(71) Applicant: NATIONAL INSTRUMENTS CORPORATION, Austin, TX (US)

(72) Inventors: Jonathan W. Hearn, Austin, TX (US); Feng Jiang, Austin, TX (US); Ryan C. Croom, Austin, TX (US); Jason D. Tongen, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 133 days.

(21) Appl. No.: 14/861,006

(22) Filed: Sep. 22, 2015

(65) Prior Publication Data
US 2017/0031796 A1 Feb. 2, 2017

Related U.S. Application Data

(60) Provisional application No. 62/199,395, filed on Jul. 31, 2015.

(51) Int. Cl.
G06F 11/30 (2006.01)
G06F 11/32 (2006.01)

(52) U.S. Cl.
CPC ...... *G06F 11/3051* (2013.01); *G06F 11/3027* (2013.01); *G06F 11/328* (2013.01)

(58) Field of Classification Search
CPC .............. G06F 11/3027; G06F 11/3048; G06F 11/3055; G06F 11/3089; G06F 11/3093; G06F 11/3051
See application file for complete search history.

(56) References Cited

U.S. PATENT DOCUMENTS

| | | | | |
|---|---|---|---|---|
| 6,633,929 B1 * | 10/2003 | Hyder | ................... | G06F 13/102 710/62 |
| 2008/0313378 A1 * | 12/2008 | Muppirala | ............ | G06F 11/008 710/302 |
| 2011/0184576 A1 * | 7/2011 | Hasan | ................... | G01D 4/002 700/293 |
| 2012/0089633 A1 * | 4/2012 | Vigneau | ............ | G06F 17/30592 707/769 |

* cited by examiner

Primary Examiner — Farley Abad
(74) Attorney, Agent, or Firm — Meyertons Hood Kivlin Kowert & Goetzel, P.C.; Jeffrey C. Hood; Mark S. Williams

(57) ABSTRACT

System and method for determining and conveying connectivity of cabled computer peripherals to a user. Characteristic information regarding each of multiple devices connected to a computer system in a system hierarchy of a bus networked system may be stored, including a device hierarchy associated with each device that identifies respective hardware nodes included in the device, and one or more visual attributes of the device. Respective system positions may be automatically determined for at least some of the devices based on the device hierarchy. A respective point of reference of at least one device may be determined based on the characteristic information of one or more of the devices. The computer system may generate information that indicates the respective system position of the at least one device relative to the respective point of reference of the device, which is useable to visually identify the device in the bus networked system.

26 Claims, 6 Drawing Sheets

AUTOMATICALLY DETERMINING AND INDICATING SYSTEM POSITIONS OF DEVICES IN A HIERARCHICAL BUS NETWORKED SYSTEM

PRIORITY DATA

This application claims benefit of priority to U.S. Provisional Application Ser. No. 62/199,395, titled "Automatically Determining and Indicating System Positions of Devices in a Hierarchical Bus Networked System," filed Jul. 31, 2015, whose inventors are Jonathan W. Hearn, Feng Jiang, Ryan C. Croom, and Jason D. Tongen, and which is hereby incorporated by reference in its entirety as though fully and completely set forth herein.

FIELD OF THE INVENTION

The present invention relates to the field of bus extenders, and more particularly to a system and method for determining and indicating system positions of devices in a hierarchical bus networked system.

DESCRIPTION OF THE RELATED ART

Computer based systems may include various connected devices, e.g., peripheral devices (also referred to as "peripherals") connected to each other and to a host computer, e.g., via cabled buses. These devices may exchange data with the (host) computer system in compliance with various standards, including, for example, Universal Serial Bus (USB), IEEE 1394, and Peripheral Component Interconnect (PCI) Express.

As these systems get larger and more complex, users may struggle with the problem of understanding which physical bus-connected entity in the real world (i.e., which physical device in the system) corresponds to a respective internal representation of the bus-connected entity, e.g., in a software user interface or application programming interface (API). For example, if three identical connected peripherals (e.g., cabled physical devices) are named "Dev1," "Dev2," and "Dev3" in software, and a user wishes to send a command to a specific one of these physical peripherals, the user must first determine the name of that specific peripheral in order to issue the command.

Current (prior art) methods of solving this problem do not scale well with system size/complexity, and include:

1. Issuing commands to identical modules the execution of which can be detected in the real world (a blinking LED, etc.), and then keeping track of the resulting observations.

2. Attaching only one of a like-kind device to the system at a time, then manually setting a name that records its physical location or making note of the automatically generated name and the hierarchical location to which it corresponds.

3. Manually correlating hardware-specific data that is printed on the physical peripheral (such as the serial number) with corresponding data provided by the software.

Consider, for example, a system consisting of several peripherals, e.g., Dev1, Dev2, Dev3, and Dev4, connected via cabled buses to a bus expansion chassis, and attached to slots 2, 3, 4, and 5 of the chassis. Each of the peripherals has a physical instance (the hardware device itself) and a software instance (the handle or identifier used in and by software to interact with the physical instance).

Now, if the real-world (i.e., physical) peripherals (Dev1, Dev2, Dev3, and Dev4) are all visually indistinguishable from one another, the user knows that the four devices are attached to slots 2, 3, 4, and 5 of the chassis, but may not know which software instance corresponds to the peripheral attached to slot 4. In order to issue a command to a specific peripheral through some API, they must somehow determine the mapping first.

The situation is further complicated if the peripherals attached to the chassis have additional expansion ports for the attachment of more peripherals, e.g., say, Dev5 and Dev7 attached to slots 6 and 7 of the chassis, and additional devices connected (via cable) thereto, e.g., Dev6 attached to Dev5, and Dev8 and Dev9 attached to Dev7. In other words, one or more of the peripheral devices may themselves be chassis with attached devices, or otherwise be attached to further peripheral devices. Such extensions or expansions can result in even more unmanageable complexity.

SUMMARY OF THE INVENTION

Various embodiments of a system and method for determining and indicating system positions of devices in a hierarchical bus networked system are presented below.

BRIEF DESCRIPTION OF THE DRAWINGS

A better understanding of the present invention can be obtained when the following detailed description of the preferred embodiment is considered in conjunction with the following drawings, in which.

Figure 1:
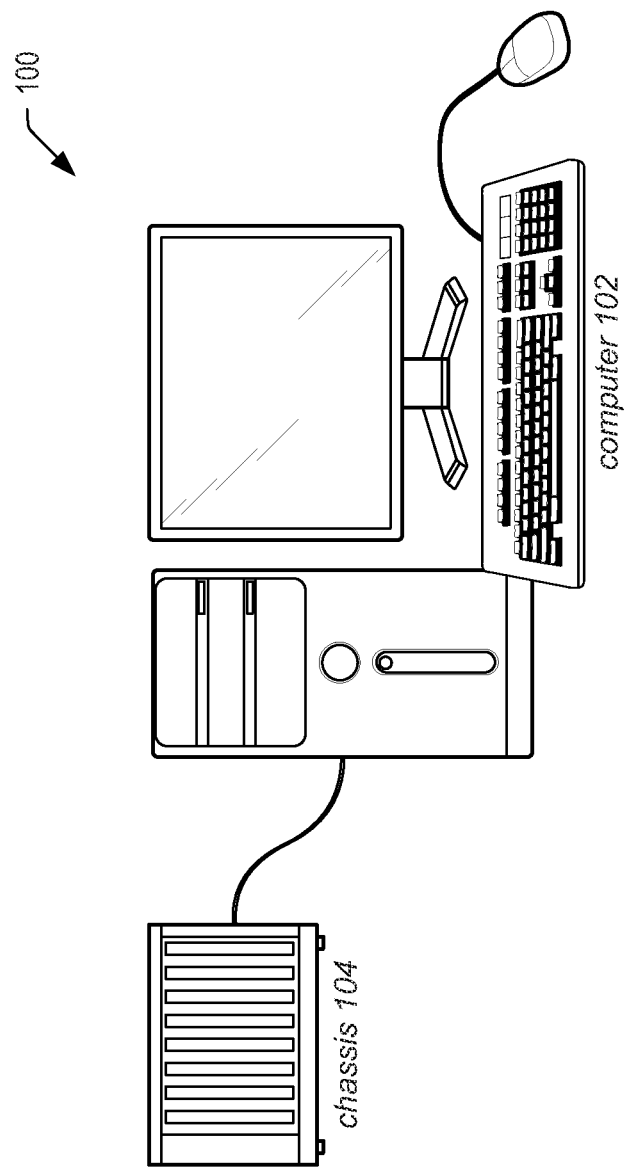
FIG. 1 illustrates a computer system configured according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected icons, wherein the plurality of interconnected icons visually indicate functionality of the program. The interconnected icons are graphical source code for the program. Graphical function icons may also be referred to as blocks.

The following provides examples of various aspects of graphical programs. The following examples and discussion are not intended to limit the above definition of graphical program, but rather provide examples of what the term "graphical program" encompasses:

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or icons are often referred to as the block diagram portion of the graphical program.

Data Flow Program—A Software Program or a Hardware Configuration Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow"

or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected icons (blocks), wherein at least a subset of the connections among the icons visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with blocks in the graphical program. For example, when Input Controls and Output Indicators are created in the GUI, corresponding blocks (e.g., terminals) may be automatically created in the graphical program or block diagram. Alternatively, the user can place terminal blocks in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized," "globally optimum," and "globally optimal" mean "globally improved with respect to specified criteria." One example of a global optimization method is differential evolution, which optimizes a problem (system or process) via iterative improvement of candidate solutions with respect to some specified measure of quality.

Peripheral Device—refers to a device connected over a network to a computer. A computer may be communicatively coupled (e.g., connected via a wired connection or connected via a wireless connection) to any number of peripheral devices. One or more of the peripheral devices may be an expansion chassis, which may further be communicatively coupled to other peripheral devices. A computer may be communicatively coupled to a number of peripheral devices of a like-kind and/or to a number of peripheral devices of different types. In one example, a number of expansion chassis may be communicatively coupled to each other (e.g., a first expansion chassis may be "daisy-chained" to a second expansion chassis and so on). A peripheral device may also house a port that allows a second peripheral device to be communicatively coupled thereto.

Hardware Node—refers to a hardware entity in a bus networked system that can be independently detected by host software using the enumeration mechanisms of the bus technology (e.g., PCI). In other words, a hardware node is a separately bus addressable or enumerable hardware unit that may be a device or a portion of a device. Note that the term "independent" refers to the appearance or representation of the hardware node to the software, not to its physical manifestation. That is, multiple hardware nodes may be implemented on one physical ASIC/chip and also multiple chips may be implemented on one physical device. A hardware node may serve or implement one or more functions (e.g., an application-specific function, pass-through functionality, and/or identification functionality). For example, upon recognition by the operating system of a computer system, the operating system may load a driver designated to talk to a particular hardware node. This may provide or expose device functionality to users (e.g., to access a hard drive, to capture data, to operate a camera, etc.), may enable the operating system to discover other devices in the system through the device using the same bus technology (e.g., as a bridge), and/or the hardware node may lie dormant (e.g., because its purpose is trivial, because the node is a result of non-technical design decisions, etc.). A peripheral device may contain one or more hardware nodes. At least one of these hardware nodes may be used to determine and/or record the instance of the device during device enumeration.

System Hierarchy—refers to a collection of devices, e.g., peripheral devices, that are communicatively coupled to a host computer system, and in some embodiments, may also include the host computer system, e.g., as a root device of the hierarchy.

System Bus Hierarchy—refers to a collection of hardware nodes corresponding to a collection of devices in the system hierarchy. The system hierarchy, as a collection of devices, may include a number of hardware nodes associated with each device. These hardware nodes may be referred to as a system bus hierarchy or a system-wide inter-device collection of hardware nodes. In contrast with the system hierarchy, no device boundaries are reflected in the system bus hierarchy.

Device Hierarchy—refers to a collection of non-transitory information relating to a device (e.g., a peripheral device) that allows the boundaries of the device to be determined. In other words, the device hierarchy allows the determination of which subset of the system bus hierarchy corresponds to the device. The device hierarchy may include a number of hardware nodes included in the device, the physical relationship between the hardware nodes (which may be specific to the kind of bus the system uses (e.g., PCI)), information usable to distinguish those hardware nodes from other hardware nodes in the system bus hierarchy, and/or any other appropriate information. The device hierarchy may be determined based on the device's hardware architecture and may be used to determine the device's system position. Note that the device hierarchy may be confirmed by information accessible by the operating system of the computer system to which a particular device is connected and/or by a hardware register of the particular device. A device hierarchy may be determined by static or dynamic information provided by a device driver. That is, the device driver may override hardware registers, may compensate for missing capabilities of the device, and/or may simulate virtual devices and virtual plurality.

System Position—refers to information pertaining to the connectivity and location of a device within the system hierarchy.

FIG. 1—Computer System

FIG. 1 illustrates a computer system 100 that includes computer 102 configured to communicate with chassis 104. Computer 102 may be communicatively coupled to chassis 104 via a network (e.g., a wired connection or a wireless connection). The network can also be any of various types, including a LAN (local area network), WAN (wide area network), the Internet, or an Intranet, among others.

As shown in FIG. 1, the computer system 100 may include a display device configured to display any number of images and/or programs (e.g., a graphical program). The display device may also be configured to display a graphical user interface or front panel of the graphical program during execution of a graphical program. The graphical user interface may comprise any type of graphical user interface, e.g., depending on the computing platform.

Computer 102 may include at least one memory medium on which one or more computer programs or software components may be stored according to some embodiments of the present invention. For example, the memory medium may store one or more graphical programs. Additionally, the memory medium may store a graphical programming development environment application used to create and/or execute such graphical programs. The memory medium may also store operating system software, as well as other software for operation of computer 102. Various embodiments further include receiving or storing instructions and/or data implemented in accordance with the foregoing description upon a carrier medium.

The computer may include at least one central processing unit or CPU (processor), which is coupled to a processor or host bus. The CPU may be any of various types, including an x86 processor, e.g., a Pentium class, a PowerPC processor, a CPU from the SPARC family of RISC processors, as well as others. The memory medium, typically comprising RAM and referred to as main memory, may be coupled to the host bus by means of memory controller. The main memory may store a program configured to carry out the methods discussed below. The main memory may also store operating system software, as well as other software for operation of the computer system.

It is noted that any type of computer system configuration or architecture can be used as desired, and FIG. 1 illustrates a representative PC embodiment. It is also noted that the computer system may be a general purpose computer system, a computer implemented on a card installed in chassis 104, or other types of embodiments. Elements of a computer not necessary to understand the present description have been omitted for simplicity.

Exemplary Systems

Embodiments of the present invention may be involved with mapping peripheral devices connected to a computer and presenting data correlating a hardware instance of a peripheral device to a software instance of a device. However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2:
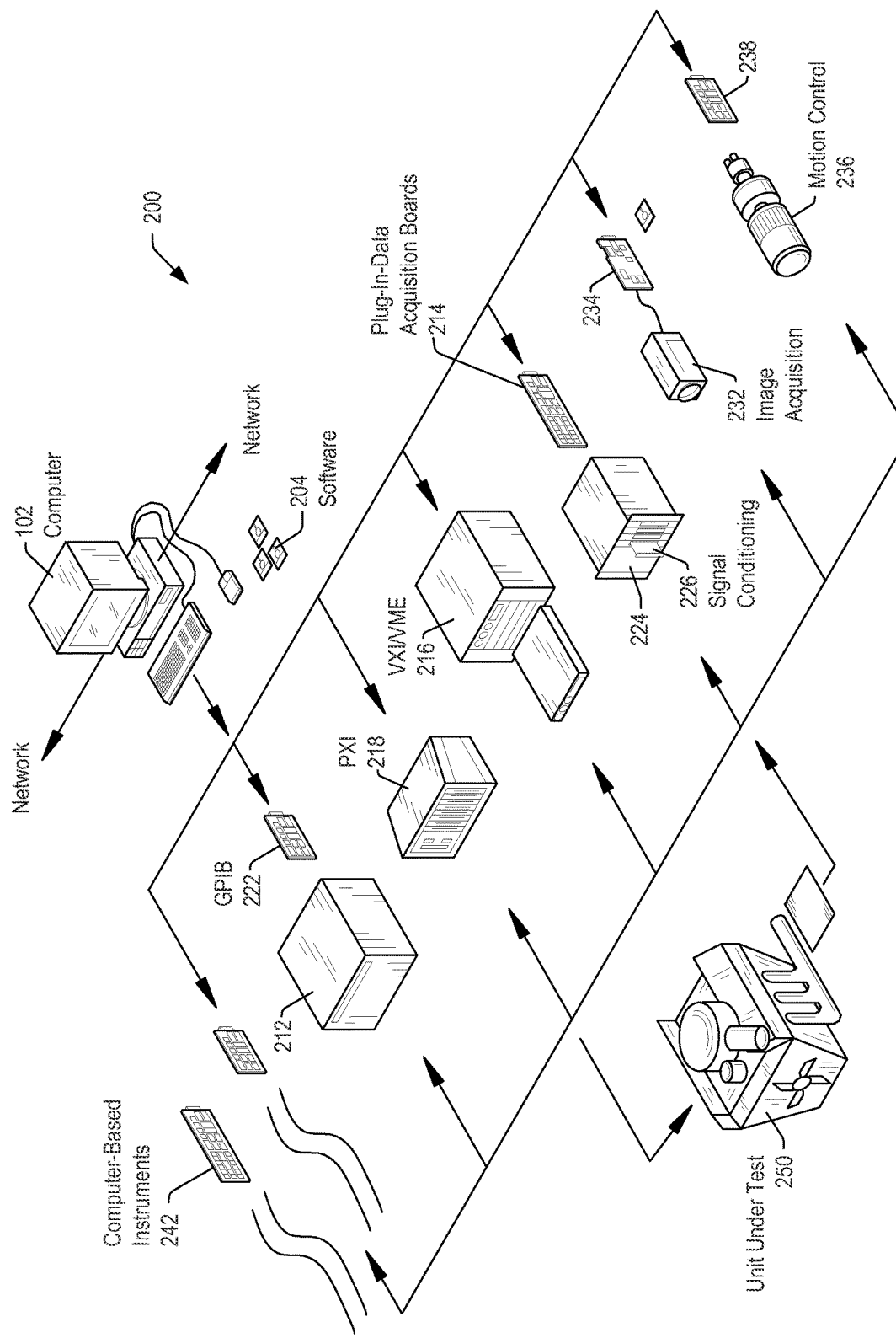
FIG. 2 illustrates a system of cabled computer peripherals according to some embodiments.

FIG. 2 illustrates a system of cabled computer peripherals according to some embodiments. System 200 comprises a host computer 102, which couples to one or more peripheral devices. The host computer 102 may comprise a CPU, a display screen, memory, and one or more input devices such as a mouse or keyboard as shown. The computer 102 may operate with the one or more peripheral devices to analyze, measure, or control a unit under test, e.g., via execution of software 204.

The one or more peripheral devices may include a GPIB instrument 212 and associated GPIB interface card 222, a data acquisition board 214 inserted into or otherwise coupled with chassis 224 with associated signal conditioning circuitry 226, a VXI instrument 216, a PXI instrument 218, a video device or camera 232 and associated image acquisition (or machine vision) card 234, a motion control device 236 and associated motion control interface card 238, and/or one or more computer based instrument cards 242, among other types of devices. The computer system may couple to and operate with one or more of these instruments. The instruments may be coupled to the unit under test 250, or may be coupled to receive field signals, typically generated by transducers. System 200 may be used in a data acquisition and control application, in a test and measurement application, an image processing or machine vision application, a process control application, a man-machine interface application, a simulation application, or a hardware-in-the-loop validation application, among others.

Figure 3:
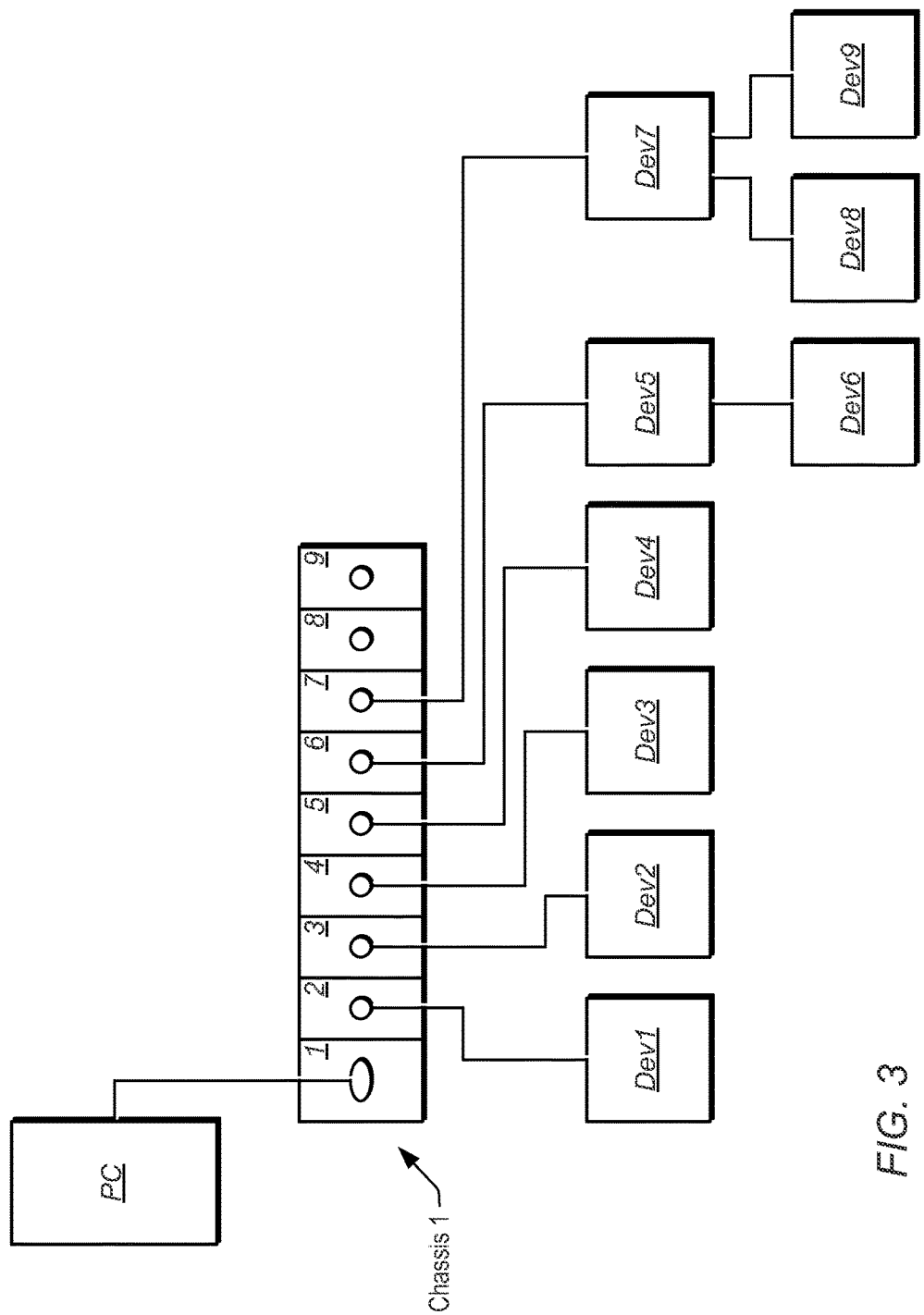
FIG. 3 illustrates a high level block diagram of a system of peripheral devices according to some embodiments.

FIG. 3 illustrates a high level block diagram of a system of peripheral devices according to some embodiments. FIG. 3 illustrates several peripheral devices (e.g., Dev1, Dev2, etc.) connected via cabled buses to another peripheral device, a bus expansion chassis. The bus expansion chassis may be connected (e.g., via slot 1 of the expansion chassis) to a computer (e.g., computer 102). FIG. 3 illustrates a first device, Dev1, connected to slot 2 of the expansion chassis. A second device, Dev2, is connected to slot 3 of the expansion chassis. A third device, Dev3, is connected to slot 4 of the expansion chassis. A fourth device, Dev4, is connected to slot 5 of the expansion chassis. A fifth device, Dev5, is connected to slot 6 of the expansion chassis. A sixth device, Dev6, is connected to an expansion port of Dev5. A seventh device, Dev7, is connected to slot 7 of the expansion chassis. An eighth device, Dev8, and a ninth device, Dev9, are connected to respective expansion ports of Dev7. Note that any number of devices may be connected to a host computer (e.g., a plurality of devices, including at least on chassis and at least one peripheral device connected to the at least one chassis).

Each of the peripheral devices has a physical instance (i.e., the hardware device itself) and a software instance (e.g., a handle or an identifier used in software to interact with the peripheral device's physical instance). In an embodiment, a user and/or a software program may wish to interact (e.g., issue a command) with a specific one of the peripheral devices connected to the computer. One means of accomplishing this is to map the physical instance of a peripheral device to the software instance of the peripheral device. Once the connected peripheral devices have been mapped, data may be conveyed (e.g., to a user, to a program, to a driver, etc.) that correlates the software instance to the corresponding hardware instance.

Figure 4:
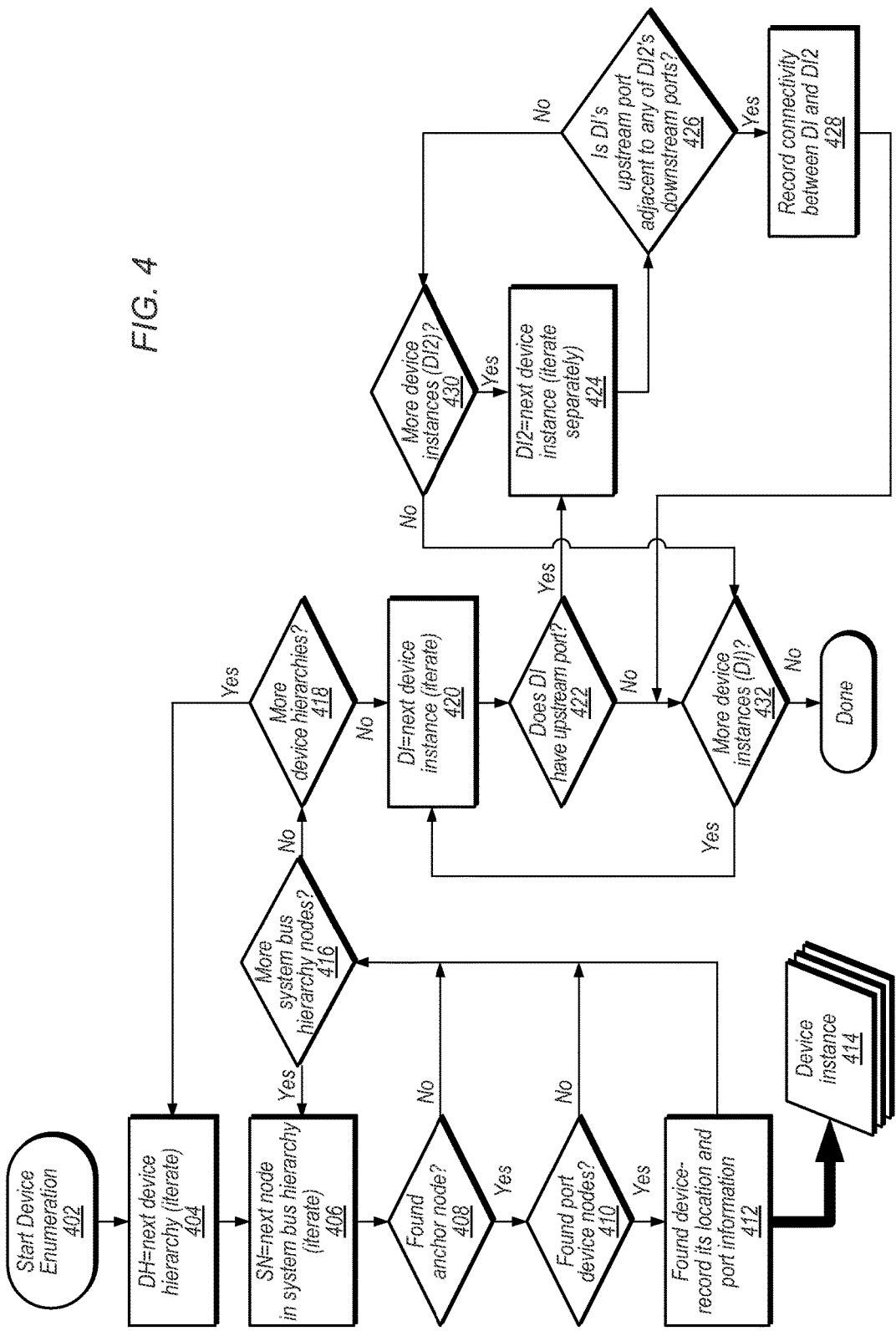
FIG. 4 is a flowchart diagram illustrating a method for mapping peripheral devices communicatively coupled to a computer system according to some embodiments.

FIG. 4—Mapping Flowchart Diagram

FIG. 4 illustrates a flowchart diagram of a method for mapping peripheral devices communicatively coupled to a computer system according to some embodiments. The algorithm usable to carry out the mapping described herein may be run by the computer system to which the peripheral devices are communicatively coupled (e.g., by the host of the system hierarchy). At method element 402, the method for mapping peripheral devices communicatively coupled to a computer system may begin with enumerating the peripheral devices that comprise the system hierarchy. This enumeration may enable the computer system to record a device instance for each of a plurality of peripheral devices in the system hierarchy, which may then be used to determine a given peripheral device's system position.

To do so, iteration of each device hierarchy, starting with a first device hierarchy, begins at method element 404. A device hierarchy is information that determines a device's intra-device hardware node hierarchy and allows for the determination of which subset of nodes in the system bus hierarchy correspond to the particular device. For example, referring back to FIG. 3, each device (e.g., Dev1) corresponds to a device hierarchy that allows the host to determine the subset of hardware nodes that comprise the system bus hierarchy that correspond to Dev1.

For each device hierarchy iteration, a nested iteration of the next hardware node in the system bus hierarchy begins at method element 406. In other words, each node in the system bus hierarchy is evaluated (as discussed below) such that when the appropriate node(s) are found (e.g., an anchor node and/or a port device node), the host may record an instance of the peripheral device corresponding to the current device hierarchy iteration.

In order to successfully record an instance of a peripheral device in the system hierarchy, the algorithm may require detection of both an anchor node (at method element 408) and a port device node (at method element 410). In other words, just detecting an anchor node may not always be enough because the characteristics of the device hierarchy may be such that finding only the anchor node does not guarantee that the device being sought has been found. Therefore, if an anchor node is found at method element 408, then, at method element 410, the algorithm searches the next hardware node of the system bus hierarchy within the device hierarchy for a port device node. If one or more port device nodes are found, then at method element 412, the algorithm determines that a device is found. Then, at method element 414, the system position of the device (including its port information) may be recorded as a device instance.

On the other hand, if an anchor node is not found at method element 408, then the algorithm evaluates, at method element 416, whether there is another system bus hierarchy node within the current device hierarchy. This evaluation is based on the information that comprises the device hierarchy. If there is another system bus hierarchy node within the current hierarchy, then that node is evaluated to determine whether it is an anchor node and/or a port device node at method elements 408 and 410, respectively. This iterative process continues for all of the nodes within the device hierarchy.

If the algorithm determines at method element 416 that there are no more system bus hierarchy nodes within the device hierarchy, then the algorithm evaluates, at method element 418, whether there is another device hierarchy. In other words, the algorithm evaluates whether there is another peripheral device within the system hierarchy that has not gone through the iterative process described above. If there is another device hierarchy, then the algorithm, at method element 404, begins the iterative process described above of evaluating the system bus hierarchy nodes within the device hierarchy.

If there is not another device hierarchy (e.g., all of the peripheral devices in the system hierarchy have been enumerated), then the algorithm, at method element 420, may begin an iterative process of recording the connection(s) between the enumerated device instances found in the above method elements. The process of recording the connections may begin at method element 422, taking a first device instance recorded at method element 414, wherein the algorithm may determine whether the first device instance (DI) has an upstream port (e.g., a port allowing connection to another peripheral device toward the host, such as the port of Dev8 in FIG. 3 that allows the connection to Dev7). If the first device instance does have an upstream port, then, at method element 424, the algorithm may retrieve the next device instance (DI2) recorded at method element 414. At method element 426, the algorithm may evaluate both DI and DI2 to determine whether DI's upstream port, found at method element 422, is adjacent to any of DI2's downstream ports. This determination may be based on the system position information found at method element 412 and recorded at method element 414.

If none of DI2's downstream ports is adjacent to DI's found upstream port, then the algorithm may determine, at method element 430, whether there are more device instances. If there are more device instances, then the algorithm may identify the next device instance at method element 424 and determine whether any of the downstream ports of the new device instance is adjacent to the found upstream port of DI at method element 426. If none of the device instances recorded at 414 has a downstream port adjacent to DI's found upstream port, then the algorithm may determine that DI has no connection to another detectable peripheral device via its found upstream port. On the other hand, if any peripheral device instance recorded at 414 has a downstream port that is adjacent to DI's upstream port, then the connection is recorded at method element 428. In either case (either after a connection between DI's upstream port and the downstream port of another peripheral device has been found or after it is determined that DI has no connection to another detectable peripheral device), the algorithm may determine, at method element 432 whether there are more device instances that have not gone through the process described above. If there are, then the next device instance is identified at method element 420 and the above process is repeated. If there are no more device instances (e.g., all of the device instances recorded at method element 414 have gone through the process described above), the device enumeration process is complete.

Figure 5:
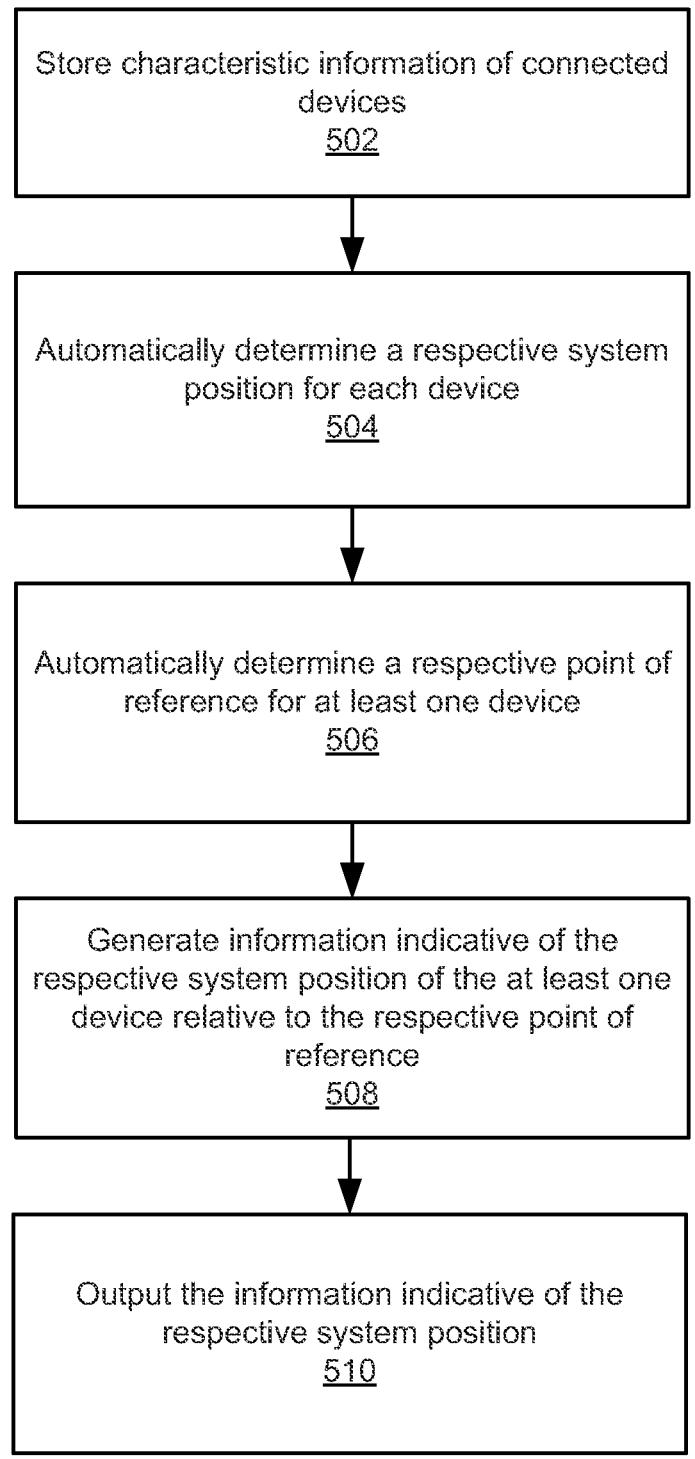
FIG. 5 is a flowchart diagram of a method for determining a system position and a point of reference for peripheral devices communicatively coupled to a computer system.

FIG. 5—Flowchart of a Method for Determining and Indicating System Positions of Devices in a Hierarchical Bus Networked System FIG. 5 illustrates a method for determining and indicating system positions of devices in a hierarchical bus networked system. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a computer system to which a plurality of devices (e.g., peripheral devices) is connected in a system hierarchy may store characteristic information regarding each of the plurality of devices. The system hierarchy may include any number of peripheral devices communicatively coupled to the computer system (e.g., Referring back to FIG. 3, for example, nine devices and an expansion chassis are communicatively coupled to a personal computer. Each of the nine devices and the expansion chassis is included in the system hierarchy, and each of the nine devices and the expansion chassis is a peripheral device. As shown in FIG. 3, for example, a number of peripheral devices may be connected to an expansion chassis and/or connected to others of the peripheral devices.

In some embodiments, the system hierarchy may comprise more than one expansion chassis communicatively coupled to each other and/or to the computer system. In some embodiments, a number of peripheral devices may be communicatively coupled to each other, even in a scenario in which neither peripheral device is an expansion chassis. For example, referring back to FIG. 3, devices 8 and 9 are communicatively coupled to device 7. Notably, the system hierarchy may comprise a number of peripheral devices much larger than the number of peripheral devices shown in FIG. 3 (e.g., 50 devices, 100 devices, 500 devices, etc.).

The characteristic information for each peripheral device may comprise a device hierarchy. The device hierarchy refers to a collection of non-transitory information relating to the peripheral device that allows the boundaries of the device to be determined within the system bus hierarchy. In other words, the device hierarchy allows the determination of which subset of the system bus hierarchy corresponds to the device. The device hierarchy may include a number of hardware nodes associated with the device, the physical relationship between the nodes (which may be specific to the kind of bus the system uses (e.g., PCI)), information usable to distinguish those nodes from other nodes in the system bus hierarchy, and/or any other appropriate information. The device hierarchy may be determined based on the device's hardware architecture and may be used to determine the device's system position according to the enumeration procedure described above with respect to FIG. 4.

The characteristic information may further include one or more visual attributes of the device. These visual attributes may include one or more physical dimensions of the device (e.g., the length of the device, width of the device, height of the device, or any combination thereof), the color of the device, the relative size of the device as compared to others of the plurality of devices (e.g., expressed as a percentage, categorically (i.e., the largest device in the system hierarchy), or by any other means), the number of other devices immediately connected to the device, the number of like-kind instances of the device in the system hierarchy (this may include, for example, devices that are identical, devices that are visually indistinguishable, devices that are similar in appearance, or the like), the model of the device, or any other information useable to visually distinguish or to describe the device to an observer.

The characteristic information may further include information pertaining to a technical limitation regarding determining the respective system position of the device. For example, the host may be unable to generate meaningful system position information for at least one of the devices in the system hierarchy. In other words, the technical limitation may include an inability of the device to be queried. That is, some devices (e.g., older peripheral devices) may not be queryable by the host computer system due to technical limitations of the device. These devices may not be capable of providing the information used to enumerate the device as discussed above with respect to FIG. 4. In such a case, a user may be prompted to input a name of the device and/or other information related to the device (e.g., type of device, model of device, port information, etc.). In other words, in some embodiments, a respective system position may be automatically determined for each of at least a subset of the plurality of devices in the system hierarchy based on the respective device hierarchy of the at least a subset of the plurality of devices.

The characteristic information may further include a number of expansion ports on the device for the attachment of other devices. For example, with respect to FIG. 3, Dev7 has at least two expansion ports to which Dev8 and Dev9 are attached. The characteristic information may further include whether the respective system position of the device is visually ambiguous. Some devices (e.g., devices that are unique or whose physical proximity to the host render them visually distinct) may be visually apparent to a user without a reference to other peripheral devices in the system hierarchy. Note that the information that indicates the respective system position of the at least one device may include at least one of the one or more visual attributes of the at least one device.

Note that the characteristic information may be determined by the computer system, by a user, or by any combination thereof. For example, the computer system may be able to discern all or some of the characteristic information of a particular device in the system hierarchy (e.g., the device hierarchy, the physical dimensions of the device, the model of the device, the number of like-kind instances of the device, etc.). A user may also determine some or all of the characteristic information of a particular device. For example, a user may decide that a particular device may serve as a point of reference based on the characteristic information of at least some of the devices in the system hierarchy. A user may also determine that one or more of the devices in the system hierarchy should not serve as a point of reference. A user may enter characteristic information of any number of devices into the algorithm. In other words, the characteristic information of one or more of the plurality of devices may be entered by a user.

In 504, the computer system may automatically determine a respective system position of each of a plurality of devices. This automatic determination may proceed according to the device enumeration algorithm discussed above with respect to FIG. 4. That is, the system position of the plurality of devices may be determined based on the respective device hierarchy of each of the plurality of devices.

In 506, the computer system may automatically determine a respective point of reference of at least one device of the plurality of devices for which the system position was determined in 504. The respective point of reference of a device may be one of the plurality of devices, including the device itself or a device other than the device itself. In other words, a device may be its own point of reference, i.e., the respective point of reference of the at least one device may be the at least one device. In some embodiments, at least two devices of the plurality of devices may have a common respective point of reference. The point of reference for a given device may be determined based on the characteristic information of one or more of the plurality of devices in the system hierarchy (e.g., based on the one or more visual attributes of the device and/or based on the one or more visual attributes of the respective point of reference), and may be or include a readily identifiable real-world hardware instance. The point of reference may thus provide an easily identified relative reference point whereby a respective set of peripherals may be identified. In other words, respective sets of peripheral devices may be identified with respect to a given point of reference. For example, in some embodiments, the point of reference of a first peripheral device may be a chassis to which the first peripheral device is communicatively coupled.

The respective point of reference of a device may be chosen so as to take advantage of certain characteristics of the devices in the system hierarchy (e.g., the respective point of reference of at least one device is determined based at least in part on the relative size of the at least one device as compared to others of the plurality of devices). For example, the identity of a large chassis full of cards may be evident to the user, whereas the identity of one small peripheral out of many may not be as readily apparent. Thus, in the latter case, the characteristic information of the devices in the system hierarchy may indicate that, with respect to the one small peripheral, a user may benefit from identifying the one small peripheral with respect to the chassis in order to give the user context as to the system's topology. In this case, the computer system may automatically determine that the respective point of reference of the one small peripheral is the large chassis.

The automatic determination of the respective point of reference of a device may be based on a classification scheme that uses one or more items of the characteristic information (as described above) of the devices in the system hierarchy. This classification scheme may use the (one or more items of the) characteristic information of the devices as factors in determining the point of reference of each respective device. Note that multiple devices in the system hierarchy may share a common respective point of reference. For example, two peripheral devices each connected to a large chassis may share the large chassis as a respective point of reference.

In 508, the computer system may generate, for the at least one device of the plurality of devices, information that indicates the respective system position of the at least one device relative to the respective point of reference of the at least one device. The information that indicates the respective system position may include a standard name format that indicates a connection path between the at least one device and the respective point of reference. For example, if a peripheral device is directly connected to port 1 of a peripheral in slot 6 of Chassis 1 (e.g., referring to FIG. 3, Dev5 is directly connected to port 1 of a peripheral in slot 6 of a chassis), then the information may be the standard name of "Chassis1Slot6Port1Dev1." Note that in this name, "Dev1" refers to Dev5's relative placement with respect to (port 1 of) the peripheral in slot 6 of the chassis, not Dev1 in FIG. 3. A peripheral device then chained from this peripheral device (e.g., referring to FIG. 3, Dev6 is chained from Dev5) may have the standard name of "Chassis1Slot6Port1Dev2," where similarly, "Dev2" denotes the relative placement of Dev6 in the chain of devices from the peripheral in slot 6 of the chassis, not Dev2 in FIG. 3. Note that if the information is a standard name format, a driver API for the peripheral may accept this name as a reference when issuing commands to the peripheral. In other words, the information that indicates the respective system position of at least one device may comprise a standard name format, wherein the standard name format is usable by a driver application programming interface to issue commands to the at least one device.

The information may also be a natural language sentence conveying the system position of the device. For example, the sentence may read: "This device is the first device connected to port 1 of the device in slot 6 of Chassis 1." The information may also be a model name of at least one device and/or of the respective point of reference (e.g., the model name of the chassis or of a device to which the particular device is connected). The information may also be a graphical representation of the physical layout of the device. The graphical representation may include the layout of the peripheral device relative all of the other devices in the system hierarchy, relative to some of the device in the system hierarchy, or relative to the respective point of reference. Note that the information may include one or more of the visual attributes of the particular device and/or of the respective point of reference of the particular device.

In 510, the computer system may output the information that indicates the respective system position of the at least one device (e.g., the particular device for which the information was generated in 508) such that the information is useable to visually identify the at least one device in the bus networked system.

Figure 6:
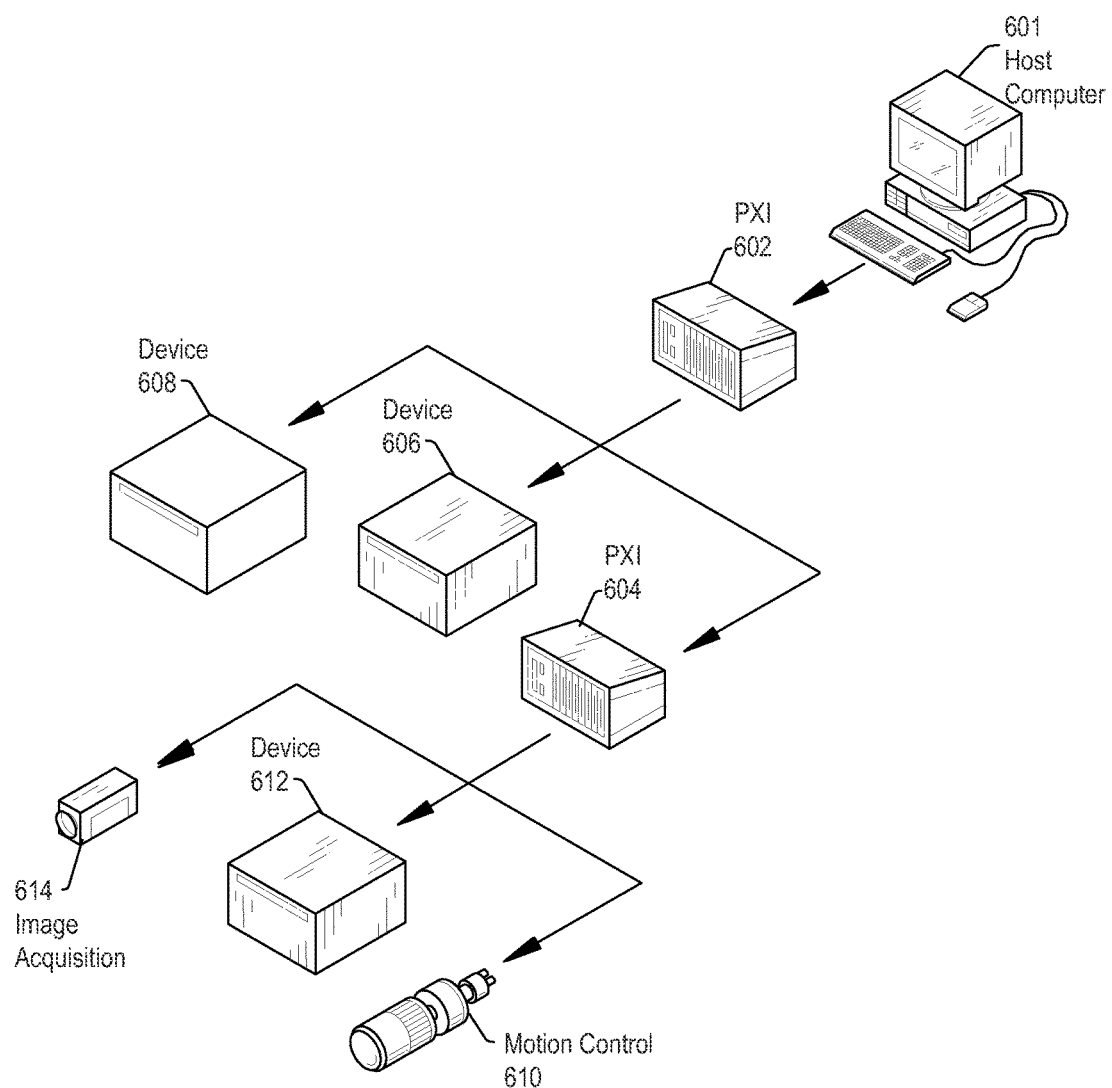
FIG. 6 illustrates an example of a system hierarchy according to some embodiments.

FIG. 6—Example System Hierarchy

FIG. 6 illustrates an example of a system hierarchy with a plurality of devices communicatively coupled to host computer 601. FIG. 6 illustrates one of many possible embodiments. In FIG. 6, PXI chassis 602 is illustrated connected to host computer 601, wherein a number of devices attached thereto. Note that the system hierarchy need not include a chassis, but could include any number of devices connected directly to the host computer. In the illustrated embodiment, some devices (e.g., motion control 610, image acquisition 614) may be visually distinguishable to a user. In other words, a user may be able to locate either of these devices without a point of reference.

Notably, other devices may be visually indistinguishable from each other. For example, device 606, device 608, and device 612 may appear to a user to be indistinguishable. Note that this may still be the case even in a scenario in which one or more of the devices is not identical to any other device (e.g., device 608 is not identical to any other device in the system hierarchy, including device 606 and device 612). In some cases, some variations between devices may be subtle enough that a user may have a hard time distinguishing a particular device from devices similar, though not identical, to the particular device.

Looking again at FIG. 6, the computer system may store characteristic information regarding each of the plurality of devices connected to computer 102, as described above. This characteristic information may include a device hierarchy associated with each of the plurality of devices in the system hierarchy (e.g., device hierarchy information may be associated with PXI 602, etc.). The characteristic information may further include one or more visual attributes of each device (e.g., the size and/or color of device 608). Host computer 601 may automatically determine a respective system position of each of the connected devices according to the procedure described above with respect to FIG. 4.

Host computer 601 may further automatically determine a respective point of reference of at least one device of the plurality of devices. For example, with respect to Device 612, the point of reference may be PXI 604. Other possible points of reference are possible for Device 612, depending on the characteristic information of one or more of the devices in the system hierarchy (e.g., depending on the characteristic information of Device 608, Device 606, PXI 602, etc.).

For at least one of the plurality of devices (e.g., Device 612), host computer 601 may generate information that indicates the respective system position of that device relative to the determined point of reference of that device (e.g., relative to PXI 602). Host computer 601 may output the information that indicates the respective system position of the device such that the information is useable to visually identify the at least one device in the bus networked system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium that stores program instructions executable by at least one processor of a computer system to:
   store characteristic information regarding each respective device of a plurality of devices connected to the computer system in a system hierarchy of a bus networked system,
      wherein the characteristic information for each respective device comprises:
      a device hierarchy associated with the respective device, wherein the device hierarchy identifies a respective set of hardware nodes comprised in the respective device,
      wherein the respective set of hardware nodes comprises at least one port, wherein the at least one port connects to a connected port of the computer system or of a second device; and
      one or more visual attributes of the respective device;
   automatically determine a respective system position of each respective device of the plurality of devices based on the respective device hierarchy of the plurality of devices;
   for each respective device of the plurality of devices, automatically determine a respective point of reference of one device of the plurality of devices, wherein the respective point of reference is one of the plurality of devices and is determined based on the characteristic information of one or more of the plurality of devices, wherein for each respective device of at least a subset of the plurality of devices, the respective point of reference is another one of the plurality of devices;
   generate, for each respective device of the plurality of devices,
      information that indicates the respective system position of the device relative to the respective point of reference of the device; and
   output the information that indicates the respective system position of each respective device of the plurality of devices relative to the respective point of reference of each respective device, wherein the information is useable to visually identify each respective device of the plurality of devices in the bus networked system.

2. The non-transitory computer readable memory medium of claim 1, wherein the information that indicates the respective system position comprises a standard name format that indicates a connection path between the respective device and the respective point of reference of the respective device.

3. The non-transitory computer readable memory medium of claim 1, wherein the characteristic information for each respective device of the plurality of devices further comprises at least one of:
   one or more physical dimensions of the respective device;
   a number of like-kind instances of the respective device;
   a technical limitation regarding determining the respective system position of the respective device;
   a number of expansion ports on the respective device; or
   whether the respective system position of the respective device is visually ambiguous.

4. The non-transitory computer readable memory medium of claim 3, wherein the technical limitation includes an inability of the respective device to be queried.

5. The non-transitory computer readable memory medium of claim 4, wherein said automatically determining the respective point of reference is based on a classification scheme that uses one or more items of the characteristic information for each respective device.

6. The non-transitory computer readable memory medium of claim 1, wherein the respective point of reference is determined based on the one or more visual attributes of the respective point of reference.

7. The non-transitory computer readable memory medium of claim 1, wherein the respective device comprises a first peripheral device and wherein the respective point of reference comprises a chassis to which the first peripheral device is communicatively coupled.

8. The non-transitory computer readable memory medium of claim 1, wherein the plurality of devices comprises at least one chassis and at least one peripheral device connected to the at least one chassis.

9. The non-transitory computer readable memory medium of claim 1, wherein at least two devices of the plurality of devices have a common respective point of reference.

10. The non-transitory computer readable memory medium of claim 1, wherein the information that indicates the respective system position of the respective device includes at least one of the one or more visual attributes of the respective device.

11. The non-transitory computer readable memory medium of claim 1, wherein the one or more visual attributes of the respective device include a relative size of the respective device as compared to others of the plurality of devices.

12. The non-transitory computer readable memory medium of claim 11, wherein the respective point of reference of the respective device is determined based at least in part on the relative size of the respective device as compared to others of the plurality of devices.

13. The non-transitory computer readable memory medium of claim 1, wherein the information that indicates the respective system position includes a graphical representation of a layout of the respective device relative to the plurality of devices.

14. The non-transitory computer readable memory medium of claim 1, wherein the information that indicates the respective system position includes at least one of:
   a natural language sentence;
   a model name of the respective device;
   a model name of the respective point of reference; or a graphical representation of a layout of the respective device relative to the respective point of reference of the respective device.

15. The non-transitory computer readable memory medium of claim 1, wherein the information that indicates the respective system position comprises a standard name format, wherein the standard name format is usable by a driver application programming interface to issue commands to the respective device.

16. The non-transitory computer readable memory medium of claim 1, wherein the characteristic information of one or more of the plurality of devices is entered by a user.

17. The non-transitory computer readable memory medium of claim 1, wherein the respective set of hardware nodes for each device are a subset of hardware nodes of a system bus hierarchy, wherein the system bus hierarchy comprises a collection of hardware nodes corresponding to the plurality of devices, and wherein the subset of hardware nodes includes a plurality of intra-device hardware nodes comprised in the device.

18. A system comprising:
   at least one processor; and
   a memory coupled to the at least one processor, wherein the memory has stored thereon instructions executable by the at least one processor to:
      store characteristic information regarding each of a plurality of devices connected to the system in a system hierarchy of a bus networked system, wherein the characteristic information for each device comprises:
         a device hierarchy associated with the device, wherein the device hierarchy identifies a respective set of hardware nodes comprised in the device,
            wherein the respective set of hardware nodes comprises at least one port,
            wherein the at least one port connects to a connected port of the computer system or of a second device; and
         one or more visual attributes of the device;
      automatically determine a respective system position of a subset of the plurality of devices based on the respective device hierarchy of the subset of the plurality of devices;
      automatically determine a respective point of reference of at least one device of the plurality of devices, wherein the respective point of reference is one of the plurality of devices and is determined based on the characteristic information of one or more of the plurality of devices, wherein for at least a subset of the at least one device, the respective point of reference is another one of the plurality of devices;
      generate, for the at least one device of the plurality of devices, information that indicates the respective system position of the at least one device relative to the respective point of reference of the at least one device; and
      output the information that indicates the respective system position of the at least one device, wherein the information is useable to visually identify the at least one device in the bus networked system.

19. The system of claim 18, wherein the information that indicates the respective system position comprises a standard name format that indicates a connection path between the at least one device and the respective point of reference of the at least one device.

20. The system of claim 18, wherein the characteristic information regarding each of the plurality of devices comprises at least one of:
   one or more physical dimensions of the device;
   a number of like-kind instances of the device;
   a technical limitation regarding determining the respective system position of the device;
   a number of expansion ports on the device; or whether the respective system position of the device is visually ambiguous.

21. The system of claim 18, wherein the at least one device comprises a first peripheral device and wherein the respective point of reference comprises a chassis to which the first peripheral device is communicatively coupled.

22. The system of claim 18, wherein the information that indicates the respective system position includes at least one of:
   a standard name format;
   a natural language sentence;
   a model name of the at least one device;
   a model name of the respective point of reference; or a graphical representation of a layout of the at least one device relative to the respective point of reference of the at least one device.

23. A method comprising:
   performing, by a computer system:
      store characteristic information regarding each of a plurality of devices connected to the computer system in a system hierarchy of a bus networked system, wherein the characteristic information for each device comprises:
         a device hierarchy associated with the device, wherein the device hierarchy identifies a respective set of hardware nodes comprised in the device, wherein the respective set of hardware nodes comprises at least one port, wherein the at least one port connects to a connected port of the computer system or of a second device; and
         one or more visual attributes of the device;
      automatically determine a respective system position of a subset of the plurality of devices based on the respective device hierarchy of the subset of the plurality of devices;
      automatically determine a respective point of reference of at least one device of the plurality of devices, wherein the respective point of reference is one of the plurality of devices and is determined based on the characteristic information of one or more of the plurality of devices, wherein for at least a subset of the at least one device, the respective point of reference is another one of the plurality of devices;
      generate, for the at least one device of the plurality of devices, information that indicates the respective system position of the at least one device relative to the respective point of reference of the at least one device; and
      output the information that indicates the respective system position of the at least one device, wherein the information is useable to visually identify the at least one device in the bus networked system.

24. The method of claim 23, wherein the information that indicates the respective system position comprises a standard name format that indicates a connection path between the at least one device and the respective point of reference of the at least one device.

25. The method of claim 23, wherein the at least one device comprises a first peripheral device and wherein the respective point of reference comprises a chassis to which the first peripheral device is communicatively coupled.

26. The method of claim 23, wherein the information that indicates the respective system position includes at least one of:
- a standard name format;
- a natural language sentence;
- a model name of the at least one device;
- a model name of the respective point of reference; or
- a graphical representation of a layout of the at least one device relative to the respective point of reference of the at least one device.

* * * * *